(12) United States Patent
Loiselle

(10) Patent No.: US 12,722,597 B2
(45) Date of Patent: Sep. 1, 2026

(54) ANTI-THEFT IMMOBILIZER SYSTEM AND METHOD FOR DETECTING TAMPERING OR UNAUTHORIZED USE OF A VEHICLE

(71) Applicant: Jesse Loiselle, Granby (CA)

(72) Inventor: Jesse Loiselle, Granby (CA)

( * ) Notice: Subject to any disclaimer, the term of this patent is extended or adjusted under 35 U.S.C. 154(b) by 26 days.

(21) Appl. No.: 19/010,592

(22) Filed: Jan. 6, 2025

(65) Prior Publication Data

US 2025/0136046 A1 May 1, 2025

Related U.S. Application Data

(60) Provisional application No. 63/683,814, filed on Aug. 16, 2024.

(51) Int. Cl.

*B60R 25/045* (2013.01)
*B60R 25/10* (2013.01)
*B60R 25/24* (2013.01)
*B60R 25/40* (2013.01)

(52) U.S. Cl.

CPC ........ *B60R 25/045* (2013.01); *B60R 25/1001* (2013.01); *B60R 25/1004* (2013.01); *B60R 25/1018* (2013.01); *B60R 25/24* (2013.01); *B60R 25/403* (2013.01); *B60R 2325/205* (2013.01)

(58) Field of Classification Search

CPC ..... B60R 25/045; B60R 25/04; B60R 25/403; B60R 2325/205; B60R 25/1004; B60R 25/1018; B60R 25/102; B60R 25/1003; B60R 25/1001; B60R 25/00

See application file for complete search history.

(56) References Cited

U.S. PATENT DOCUMENTS

2011/0254654 A1* 10/2011 Lo ...................... G08B 13/1409 340/3.1
2020/0122689 A1* 4/2020 Sawajiri .................. B60R 25/33
2021/0362674 A1* 11/2021 Burger .................. B60R 25/225

FOREIGN PATENT DOCUMENTS

WO WO-9937510 A1 * 7/1999 ............ B60R 25/04

* cited by examiner

*Primary Examiner* — Ryan Johnson

(57) ABSTRACT

An anti-theft immobilizer system for vehicles is disclosed, comprising a module installed on the vehicle's onboard battery terminals to act as an intermediary between the battery and the ignition system. This design allows rapid, user-friendly installation without requiring professional expertise. The system includes a programmable circuit board, an ultrasonic sensor, a digitally activated relay, and an independent power source. Key functionalities include measuring instantaneous current demand in the ignition circuit and disrupting the circuit to prevent engine startup. The module integrates wireless communication features, such as Bluetooth and LTE, enabling remote arming and disarming via a mobile application. Additionally, the system detects tampering or unauthorized access by measuring the distance between the module and the vehicle hood, notifying authorized users of any irregularities. This innovative solution enhances vehicle security through advanced monitoring and remote-control capabilities.

14 Claims, 4 Drawing Sheets

ANTI-THEFT IMMOBILIZER SYSTEM AND METHOD FOR DETECTING TAMPERING OR UNAUTHORIZED USE OF A VEHICLE

RELATED PATENT APPLICATION

The present application claims the benefit of U.S. Provisional Application No. 63/683,814 filed on Aug. 16, 2024, the specification of which is incorporated herein by reference.

TECHNICAL FIELD

The technical field generally relates to anti-theft systems for vehicles, and more specifically to anti-theft vehicle immobilizer systems to prevent unauthorized use or theft of a vehicle that is equipped with an internal combustion engine by preventing said engine to be started and detect unauthorized access to said vehicle's engine regular maintenance area.

BACKGROUND

Vehicle anti-theft systems are used in vehicles to prevent unauthorized use or theft. Many different types of anti-theft systems may be used.

In vehicles equipped with internal combustion engines, anti-theft systems preventing said engine from being started are being used. A system preventing an internal combustion engine from being started typically refers to an immobilizer system and includes methods that interrupt the power supply electrical circuit to the engine starter when said system is active. Unfortunately, immobilizer systems are installed solely by a person skilled in the art, such as a qualified mechanic or technician which make them expensive and reduces the widespread use.

Anti-theft vehicle immobilizer systems can be tampered with and removed once the unwanted user gains access to the internal combustion engine' maintenance bay. Said engine maintenance bay refers to the enclosed or semi-enclosed space located at the front or rear, in some vehicles of a vehicle chassis, covered by the hood or bonnet, containing the engine, transmission system, and ancillary components, such as the radiator, battery, alternator, and associated fluid reservoirs. This compartment may also house various conduits, electrical wiring, cooling systems, and other mechanical or electronic systems essential to vehicle operation. Unfortunately, available anti-theft immobilizer systems do not have the capability to detect unwanted access to the said engine's maintenance bay and prevent theft, tempering with the anti-theft system or unauthorized use.

There is therefore a need for an anti-theft immobilizer system which will overcome at least one of the above-identified drawbacks.

SUMMARY

According to one aspect, there is provided an anti-theft immobilizer system for a vehicle, the anti-theft engine immobilizer system includes a module secured to the said engine ignition system' onboard battery terminals and electrically disposed as to be an intermediary between the said onboard battery and the said vehicle ignition system. Therefore, allowing rapid installation by any individual that has the capacity to replace the said vehicle's onboard battery. Consequently, the installation of the anti-theft immobilizer module does not need to be done solely by a person skilled in the art, such as a qualified mechanic or technician.

In one embodiment, the anti-theft engine immobilizer module includes a programmable circuit board electrically disposed to be connected to other components of the anti-theft engine immobilizer module.

In one embodiment, the anti-theft engine immobilizer module includes an ultrasonic sensor electrically disposed to be connected to other components of the anti-theft engine immobilizer module.

In one embodiment, the anti-theft engine immobilizer module includes a digitally activated relay electrically disposed to be connected to other components of the anti-theft engine immobilizer module.

In one embodiment, the anti-theft engine immobilizer module includes its own power source electrically disposed to be connected to other components of the anti-theft engine immobilizer module.

In one embodiment, the anti-theft engine immobilizer module includes its own power source electrically disposed to be connected to other components of the anti-theft engine immobilizer module.

In one embodiment, the anti-theft engine immobilizer module includes an amperemeter or equivalent sensor to measure instantaneous current demand in the vehicle ignition system circuit electrically disposed to be connected to other components of the anti-theft engine immobilizer module.

In one embodiment, the anti-theft engine immobilizer module can measure instantaneous current demand and open the vehicle ignition system circuit thus preventing the internal combustion engine from being started.

In one embodiment, the anti-theft engine immobilizer module includes a wireless communication antenna such as Bluetooth or LTE or GPS to communicate data to the authorized vehicle user's and mobile device and software application, electrically disposed to be connected to other components of the anti-theft engine immobilizer module thus allowing the authorized user to arm and disarm the system.

According to yet another aspect, there is also provided a method for detecting tampering or unauthorized use of a vehicle, the method comprising: the vehicle including an internal combustion engine, the engine including a sole regular maintenance access point, the sole maintenance access point including a hinged cover (hood). The said engine including an ignition system powered by an onboard battery, wherein the battery is exclusively accessible by the said hinged cover. The anti-theft immobilizer module installed on the vehicles' on-board battery terminals and measures the distance between said module and said hinged cover (hood) consequently providing information on whether the hinged cover has moved from its intended closed position. Therefore, the anti-theft immobilizer module can detect unauthorized access to the vehicles' engine' sole regular maintenance access point. Consequently, the anti-theft immobilizer system can notify authorized user and/or other interested parties of an unauthorized use or tampering of the vehicle.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Although the embodiments of the anti-theft vehicle immobilizer system 50 and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical or electrical configurations, may be used for an anti-theft immobilizer system 50, as will be briefly explained herein and as can be easily inferred herefrom by a person skilled in the art.

Figure 1:
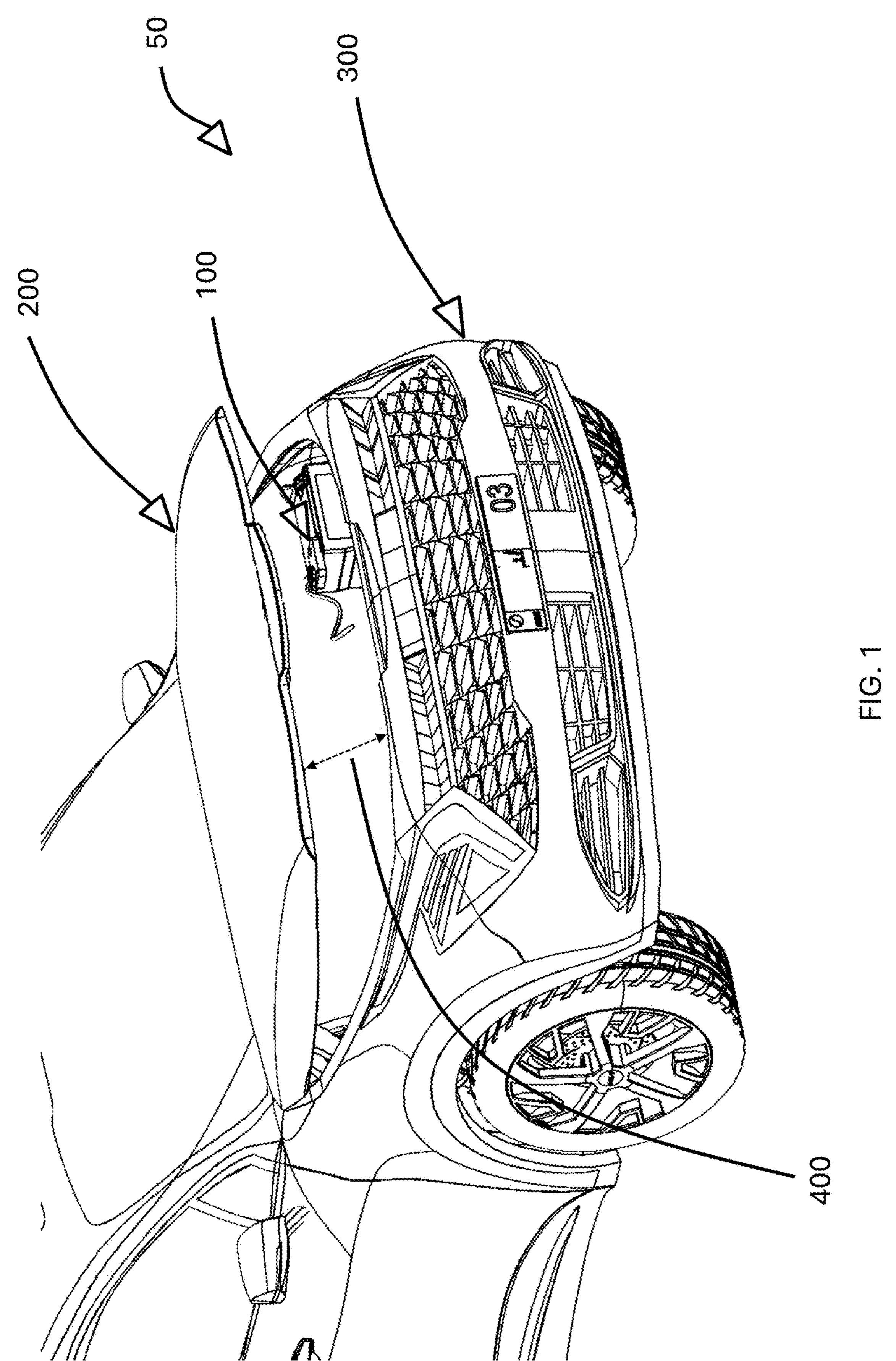
FIG. 1 shows a perspective view of the anti-theft engine immobilizer module installed on a vehicle with surrounding engine parts omitted, in accordance with one embodiment.
Figure 2:
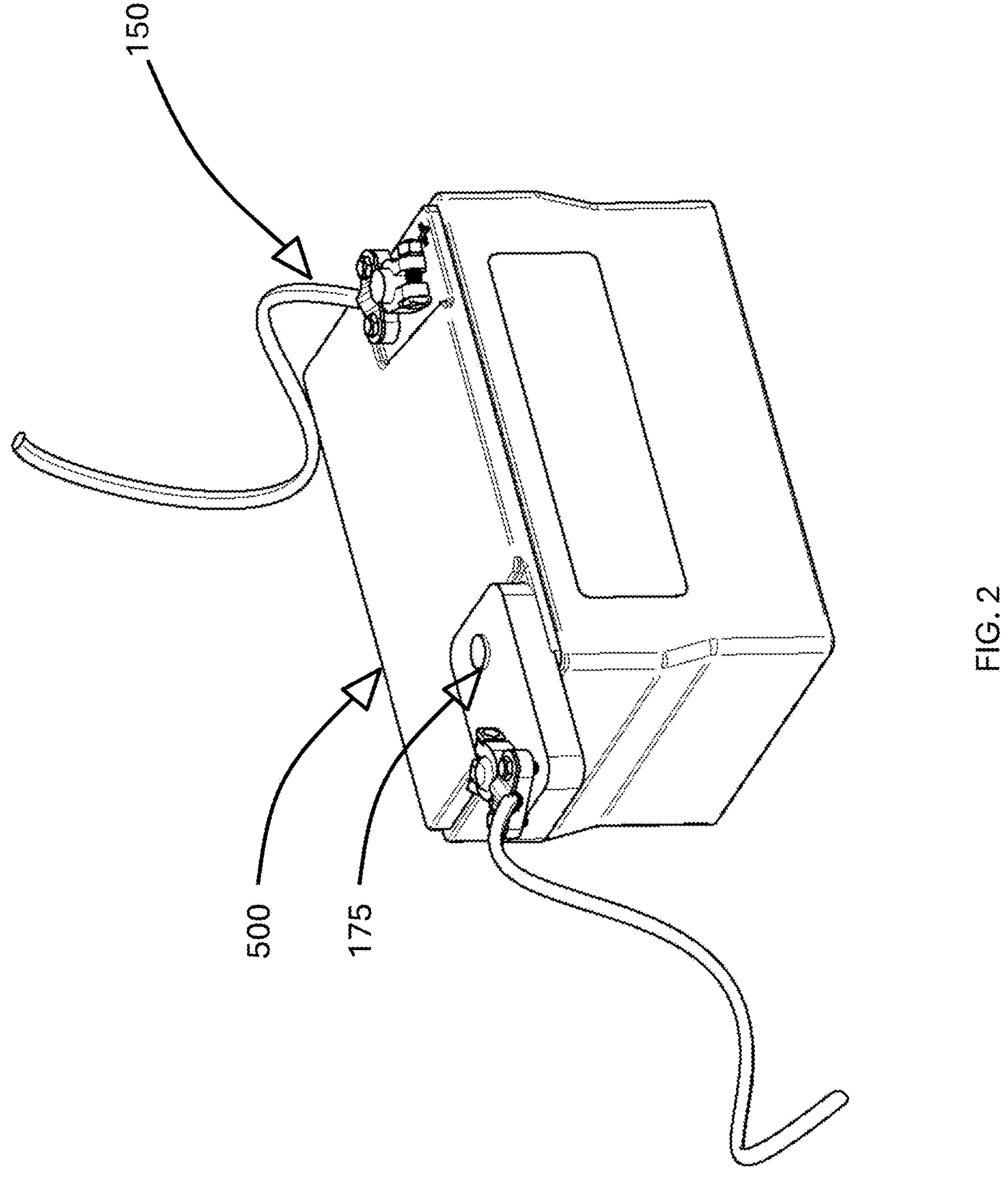
FIG. 2 shows a perspective view of the anti-theft engine immobilizer module installed on one of the vehicle's on-board battery terminals.
Figure 3:
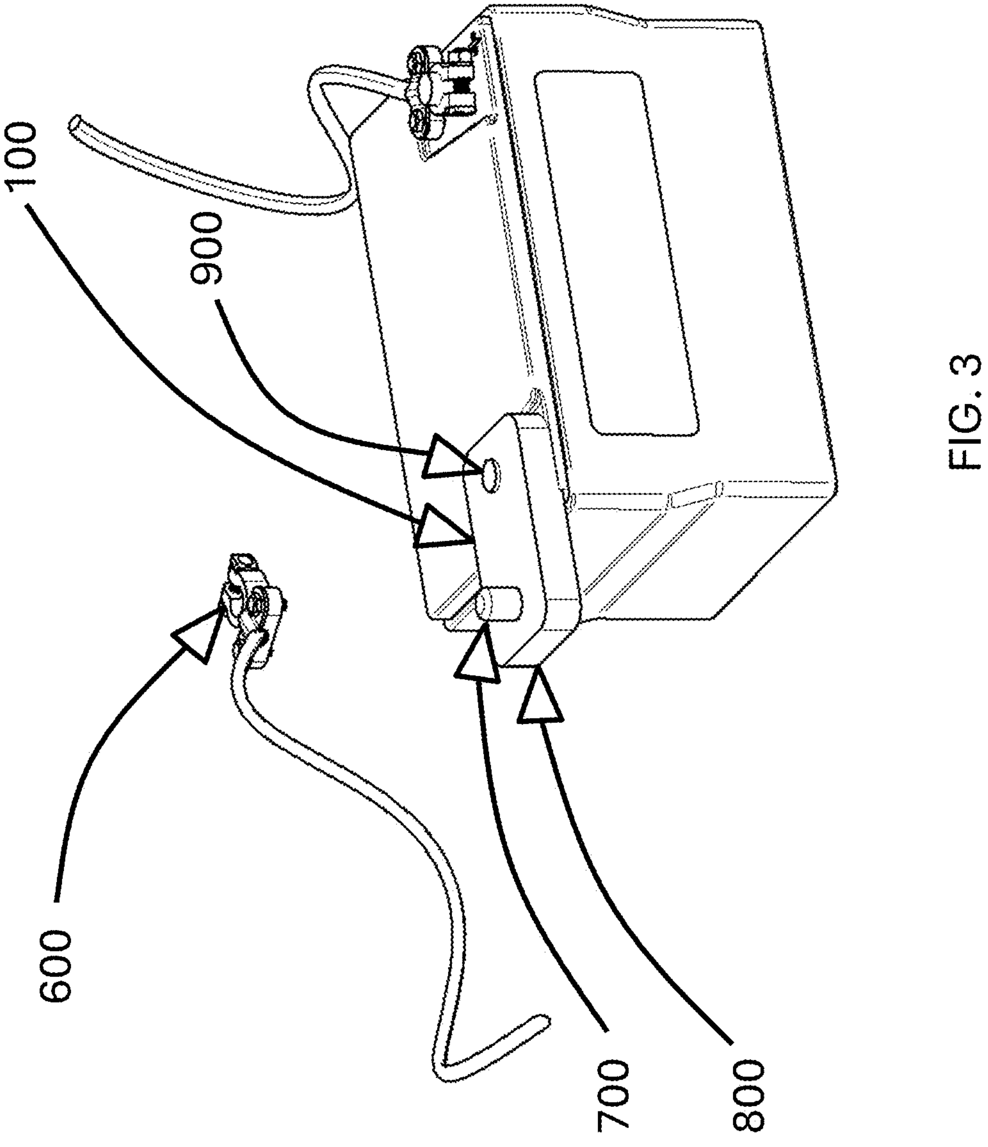
FIG. 3 is an exploded perspective view of the anti-theft engine immobilizer module installed on one of the vehicle's on-board battery terminals in FIGS. 1 and 2.
Figure 4:
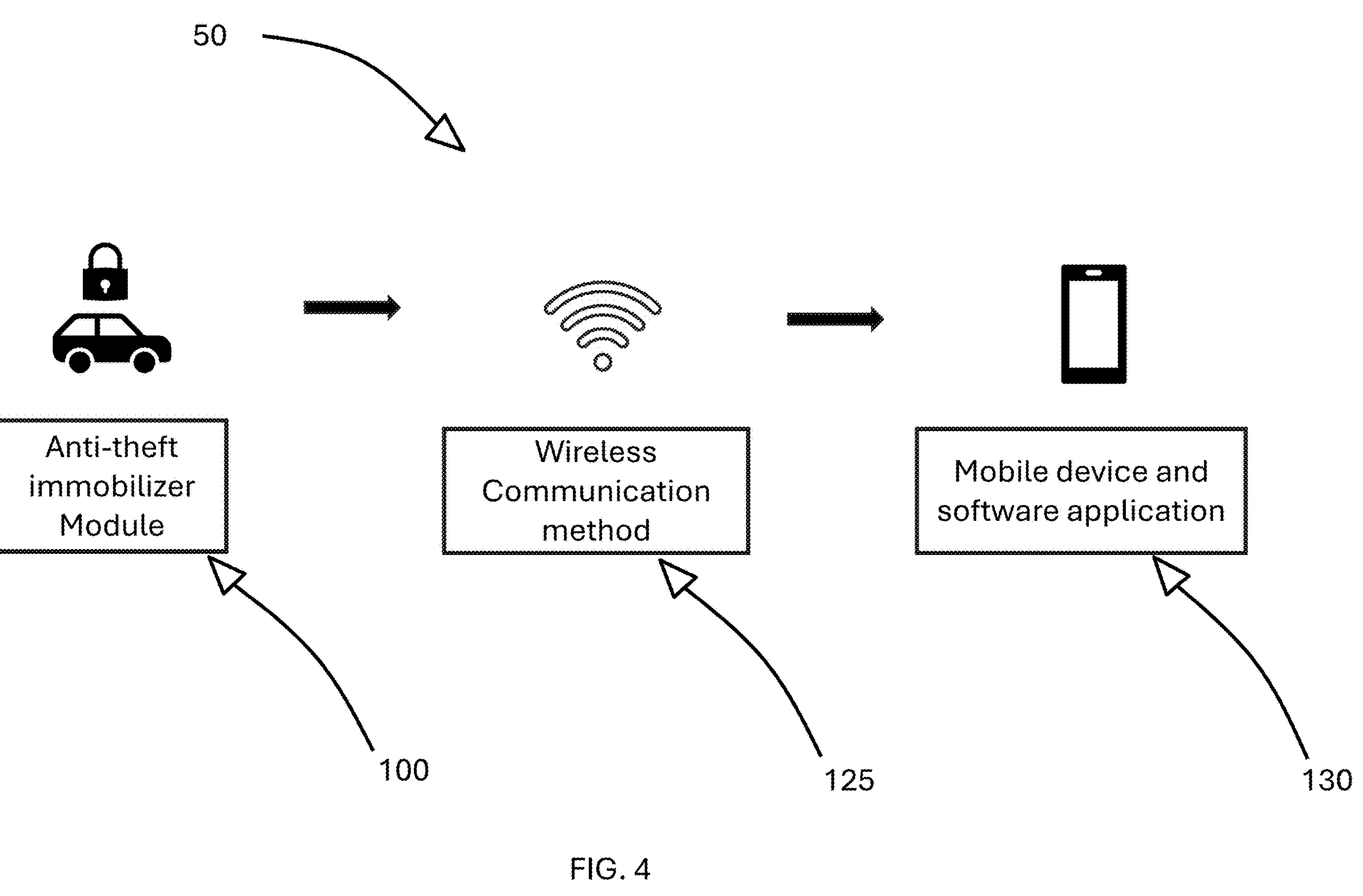
FIG. 4 is a flow chart illustrating how the anti-theft engine immobilizer module is operated by the user.

Referring first to FIGS. 1 to 3, there is provided an anti-theft immobilizer module for a vehicle 100, in accordance with one embodiment. The vehicle 300, could be any vehicle including a car, a truck, a boat, heavy equipment machine such as a loader or any other vehicle with an internal combustion engine as the main powertrain that a skilled person would consider to be suitable for use with the present anti-theft immobilizer module 100.

The vehicle 300 includes an internal combustion engine (omitted for clarity), the engine including a sole regular maintenance access point, the sole maintenance access point including a hinged cover 200.

In the illustrated embodiment, the anti-theft immobilizer module 100 installed on one of the vehicles' on-board battery terminals 900 and measures the distance 400 between said module and said hinged cover 200 consequently providing information on whether the hinged cover has moved from its intended closed position.

In the illustrated embodiment, the anti-theft immobilizer module 100 includes a single sealed enclosure 800 with internal electronic component mounting points that are omitted, a receiving bore 175 to accommodate a vehicles' ignition system 150 battery' electrical terminal.

In the illustrated embodiment, the anti-theft immobilizer module 100 includes a single engine ignition system battery electrical terminal 700 which is used to electrically connect the vehicle's existing ignition electrical terminal 600.

In the illustrated embodiment, the anti-theft immobilizer module 100 includes but are pictorially omitted a single or plurality of programmable circuit boards, a wireless communications module, positioning system tracking module, a single on-board power source, an ultrasonic sensor or other type of sensor with the capability to measure a distance in real time, a digitally activated relay, a speaker, an amperemeter or other device to measure instantaneous current variations.

In the illustrated embodiment, the anti-theft immobilizer module 100 is operated by the user via a wireless communication system 125, which establishes a connection with a server. This server facilitates seamless communication between the module and the user's mobile device 130, which is equipped with a dedicated software application. The application serves as the interface for controlling and monitoring the module, providing a secure and efficient method for managing the anti-theft functionality.

In yet another embodiment, anti-theft immobilizer module 100 is disposed as to be an intermediary between the vehicles' onboard battery 500 and the said vehicle ignition system 150.

It will be understood that the present anti-theft immobilizer module 100 presents a number of advantages when compared to existing anti-theft immobilizer systems.

For example, in contrast to existing anti-theft immobilizer systems, this concept integrates wireless communication methods and controls via a communications and control module to a mobile application device.

Furthermore, the installation method of the anti-theft immobilizer module 100 directly on the vehicles' single engine ignition system battery 500 drastically improves installation time.

Another advantage to be noted is one of the unauthorized use or detection methods described hereabove that ensures a secure system even if the anti-theft immobilizer module 100 is easily installed thus accessible to unwanted parties.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. An anti-theft immobilizer system for a vehicle including an internal combustion engine including a sole regular maintenance access point including a hinged cover (hood), the engine including an ignition system powered by an onboard battery exclusively accessible by the hinged cover, the anti-theft engine immobilizer system comprising: an anti-theft vehicle immobilizer module secured to the engine ignition system's onboard battery and electrically disposed as to be an intermediary between the onboard battery and the vehicle ignition system; a wireless communication network; a mobile phone device including a software application and interface; a single or plurality of programmable circuit boards; a single sealed enclosure with internal electronic component mounting points; and a receiving bore to accommodate a vehicles ignition system battery electrical terminal; a siren; a single on-board power source; a digitally activated relay; an amperemeter or other type of device to measure instantaneous current; and an ultrasonic sensor or other type of sensor with a capability to measure a distance in real time, the sensor operatively mounted on the onboard battery and communicatively coupled to a programmable control module, the sensor configured to detect tampering by measuring a straight and uninterrupted distance between the hinged cover and a designated permanent static reference object located within the regular maintenance access point area.

2. The anti-theft immobilizer system according to claim 1, wherein the ultrasonic sensor is mounted on the anti-theft vehicle immobilizer module and the anti-theft vehicle immobilizer module is secured to the onboard battery by a threaded, press-fit, or clamping attachment.

3. The anti-theft immobilizer system as claimed in claim 1, wherein the single or plurality of programmable circuit boards includes: a programmable control module; a wireless communications module; and a positioning system tracking module.

4. The anti-theft immobilizer system as claimed in claim 3, wherein the wireless communications module includes a capability of communicating data using LTE, Bluetooth, or GPS communication methods.

5. The anti-theft immobilizer system as claimed in claim 3, wherein the programmable control module is a programmable microprocessor communicatively coupled to the communications module and positioning system tracking module.

6. The anti-theft immobilizer system as claimed in claim 1, wherein the single on-board power source is electrically coupled to the programmable control module.

7. The anti-theft immobilizer system as claimed in claim 1, wherein the ultrasonic sensor is communicatively coupled to the programmable control module.

8. The anti-theft immobilizer system as claimed in claim 1, wherein the siren is communicatively coupled to the programmable control module.

9. The anti-theft immobilizer system as claimed in claim 1, wherein the amperemeter or other device to measure instantaneous current is communicatively coupled to the programmable control module and electrically coupled to the vehicle engine ignition circuit.

10. The anti-theft immobilizer system as claimed in claim 1, wherein the digitally activated relay comprises a mechanical relay, a solid-state relay, MOSFET, or any other suitable switching technology and is communicatively coupled to the programmable control module and electrically coupled to the vehicle engine ignition circuit.

11. The anti-theft immobilizer system as claimed in claim 3 wherein the positioning system tracking module is communicatively coupled to the programmable control module.

12. A method of detecting tampering with an anti-theft system or unauthorized use of a vehicle, the method comprising: providing a vehicle, the vehicle including an internal combustion engine, wherein the engine includes a primary regular maintenance access point with a hinged cover (hood), the access point being secured to restrict unauthorized entry, the engine includes an ignition system powered by an onboard battery, wherein the battery is exclusively accessible by moving the said hinged cover; measuring a straight and uninterrupted distance between the hinged cover and a designated permanent static reference object located within the regular maintenance access point area; detecting any subsequent movement of the hinged cover by measuring a straight and uninterrupted distance between the repositioned hinged cover and the designated permanent static reference object; and calculating a difference between an initial and subsequent measurements to determine if unauthorized use or tampering has occurred.

13. The method as claimed in claim 12, wherein the variation of the difference between the distances measured is interpreted as a movement of the hinged cover thus a tampering or unauthorized use of the vehicle.

14. A method for installing on a vehicle the anti-theft immobilizer system according to claim 1, the method comprising: providing the vehicle including an internal combustion engine, the engine including an ignition system powered by an onboard battery; electrically disconnecting a single or plurality of the vehicles' ignition system electrical connectors to the onboard battery; operatively mounting the anti-theft immobilizer system to one of the onboard battery electrical terminals; and electrically connecting the anti-theft immobilizer system to one of the onboard battery electrical terminals.

* * * * *